US005800065A

United States Patent [19]

Lyon

[11] Patent Number: 5,800,065
[45] Date of Patent: Sep. 1, 1998

[54] LINEAR MOTION BEARING SUB-ASSEMBLY WITH INSERTED RACES

[75] Inventor: Gregory S. Lyon, Mamaroneck, N.Y.

[73] Assignee: Thomson Industries, Inc., Port Washington, N.Y.

[21] Appl. No.: 857,621

[22] Filed: May 16, 1997

[51] Int. Cl.[6] ............................................. F16C 29/06
[52] U.S. Cl. ................................................. 384/45; 384/625
[58] Field of Search ................................ 384/45, 625, 43, 384/44, 49, 50

[56] References Cited

U.S. PATENT DOCUMENTS

| 3,900,233 | 8/1975 | Thomson . |
|---|---|---|
| 4,025,995 | 5/1977 | Thomson . |
| 4,515,413 | 5/1985 | Teramachi . |
| 4,527,841 | 7/1985 | Teramachi . |
| 4,531,788 | 7/1985 | Teramachi . |
| 4,576,420 | 3/1986 | Lehmann et al. . |
| 4,576,421 | 3/1986 | Teramachi . |
| 4,637,739 | 1/1987 | Hattori . |
| 4,932,067 | 6/1990 | Pester et al. . |
| 5,217,308 | 6/1993 | Schroeder . |
| 5,431,498 | 7/1995 | Lyon . |

*Primary Examiner*—Lenard A. Footland
*Attorney, Agent, or Firm*—Dilworth & Barrese

[57] ABSTRACT

A linear motion bearing assembly is provided having a rail assembly comprising a base member and a pair of vertical arms which have flexible characteristics with respect to the base member. A bearing carriage assembly is also included which has a bearing carriage and a pair of legs extending therefrom. The extending legs define a longitudinal channel for accommodating the rail assembly, and are flexible with respect to the bearing carriage. A plurality of load bearing race inserts are positioned on the vertical arms of the rail assembly and the extending legs of the bearing carriage assembly. A load bearing surface of the plurality of load bearing inserts has a predisposed compressive stress. A plurality of rolling elements are disposed in load bearing tracks which are defined by the plurality of load bearing race inserts.

15 Claims, 5 Drawing Sheets

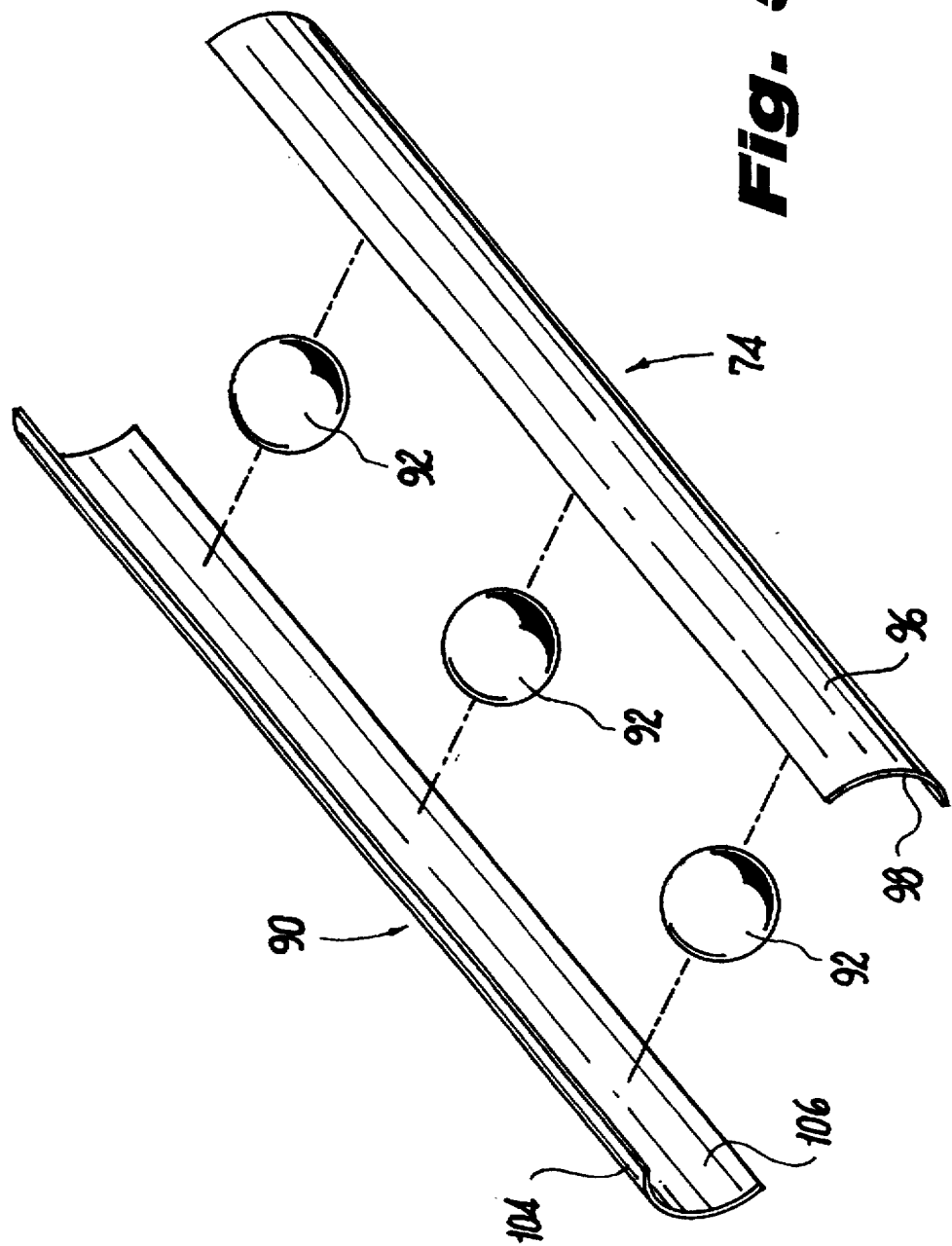

LINEAR MOTION BEARING SUB-ASSEMBLY WITH INSERTED RACES

BACKGROUND OF THE INVENTION

1. Field of the Invention

The present invention relates to linear motion bearings having races inserted into the rail and/or carriage support structures. More specifically, this invention relates to linear motion bearings with a net or residual stress within the races which enables the races to possess high load carrying characteristics.

2. Description of the Related Art

Linear motion bearing assemblies are well known in the art and are used extensively in a wide variety of machines, machine tools, transfer systems and other equipment where machine elements move with respect to one another. These assemblies typically include a bearing carriage mounted for movement along a modified Y-beam, I-beam or T-beam cross section rail. Load bearing and return tracks are provided in association with the bearing carriage for a plurality of recirculating rolling elements such as, for example, balls or rollers. These rolling elements travel alternately through the load bearing tracks and return tracks to facilitate movement of the bearing carriage along the rail with minimum friction.

End caps are usually located on the ends of the bearing carriage and may have turnarounds formed therein for transferring the rolling elements from the load bearing tracks to the return tracks. The turnarounds typically comprise a semi-toroidal shaped track dimensioned and configured for the particular rolling element being employed. At the center of the semi-toroid, an internal guide may be provided to smooth the movement of the rolling elements in the turnarounds.

The return tracks typically take the form of bores or channels conforming in size to the dimensions of the rolling elements which are cut or drilled into the depending legs of the bearing carriage. See, for example, U.S. Pat. No. 4,932,067 to Pester et al. The overall structure of this type of linear motion bearing assembly typically requires the extensive use of expensive high quality bearing steel in order to yield a bearing of sufficient strength and longevity. This is at least partially necessitated by the fact that load bearing portions require the strength and rigidity of bearing steel and are usually monolithically formed directly in the structure of the bearing carriage and/or the rail. See, for example, U.S. Pat. No. 4,637,739 to Hattori.

Fabrication of the rails and/or carriages from such material requires numerous precision machining steps as well as hardening processes on designated areas such as, for example, the contact portions of the load bearing tracks in both the carriage and the rail. This process is extremely costly and, depending on the bearing assembly structure, requires elaborate and expensive machining equipment. In addition, one characteristic of high quality bearing steel is its rigidity. This characteristic results in a requirement for extreme precision in grinding the load bearing tracks and highly accurate installation of the linear motion bearing assembly to avoid overly stressing the contact portions.

Attempts have been made in the past to isolate the highly stressed contact points within the linear motion bearing assemblies by providing inserts which are mounted to conventional rail or carriage structure. See, for example, U.S. Pat. Nos. 3,900,233 and 4,025,995 to Thomson. Load bearing track inserts are also shown in U.S. Pat. Nos. 4,515,413, 4,527,841, 4,531,788 and 4,576,421 to Teramachi and U.S. Pat No. 4,576,420 to Lehmann et al. However, these linear motion bearings do not address or overcome the inherent rigidity problem characteristic of these materials. Thus, extreme precision and accurate placement are still very definite factors affecting the operation and longevity of the linear motion bearing assembly.

Attempts have also been made in the past to reduce this inherent rigidity of structures formed entirely of high quality bearing steel. For example, U.S. Pat. No. 5,217,308 to Schroeder discloses an internal carriage structure for a linear motion bearing assembly. The carriage is configured to be supported within a frame structure by four inward facing steel raceways mounted to the frame structure. The frame structure is constructed of aluminum and is configured to allow for flexure of the upper races to take up clearances within the assembly.

Furthermore, in an attempt to optimize the contact angle of the rolling elements under load to the race inserts, U.S. Pat. No. 5,431,498 to Lyon teaches an insert in both rail and carriage assemblies. Additionally, Lyon teaches a technique of affixing the rail insert to the rail structure by means of inducing a net force between the rail support structure and the rail race insert.

However, notwithstanding the above advances in the art, it is well known that the stress-state of a bearing surface has an influence upon the performance and longevity of said surface. The stress-state may be thought of as the condition of the race material in the unloaded state. The stress-state may be influenced by residual stresses from processing, or from distortions forced upon the bearing surface during assembly. Other known factors may influence the stress-state as well. It is understood to one skilled in the art that compressive stresses may improve the rolling contact fatigue life, while tensile stresses are often detrimental to the performance and longevity of the bearing. The prior art does not teach or suggest a solution to the problems associated with the stress-state of the inserted race material. Moreover, in many cases in the prior art the resultant stress condition is in fact tensile.

Thus, it would be desirable to manufacture a linear bearing with inserted races, wherein the stress-state of the inserted races was in compression. This would optimize the ability of the bearing surface to operate in rolling contact fatigue, and provide a bearing of relatively high load carrying capability. Additionally, the new bearing configuration will provide an inserted race linear motion bearing with substantially simplified race insert geometries.

SUMMARY OF THE INVENTION

In accordance with the present invention, there is provided a linear motion bearing assembly consisting of support structures and race inserts wherein the race inserts are configured to be positioned on and in the support structures in a manner that will induce the load bearing surface of said support to exist in a compressive stress. This compressive stress state allows the surface of the race to endure higher rolling contact fatigue loads than if the surface were either in tension or had no stress condition at all.

Thus, as a primary objective of this invention, a linear motion bearing configuration is disclosed that has a plurality of race inserts for both carriage and rail assemblies that allows for the predisposition of compressive stresses on the load bearing surfaces of the race inserts. It is a further objective of this invention to allow the use of exotic materials, such as high-strength stainless steels, etc., that are commonly available only in simple shapes, i.e., flat rolled stock. It is yet a further objective of this invention to provide a race insert which may be snap-fit or sprung into the rail and carriage assemblies during fabrication. Further, the carriage and rail support structures may be formed out of lightweight materials, such as aluminum or plastic, to provide weight savings and flexibility. Also, the selection of materials and coatings, such as anodizing, provides a highly corrosion resistant linear motion bearing assembly.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein:

FIG. 5 is a detail perspective view of race inserts and rolling elements.

DETAILED DESCRIPTION OF THE PREFERRED EMBODIMENTS

Figure 1:
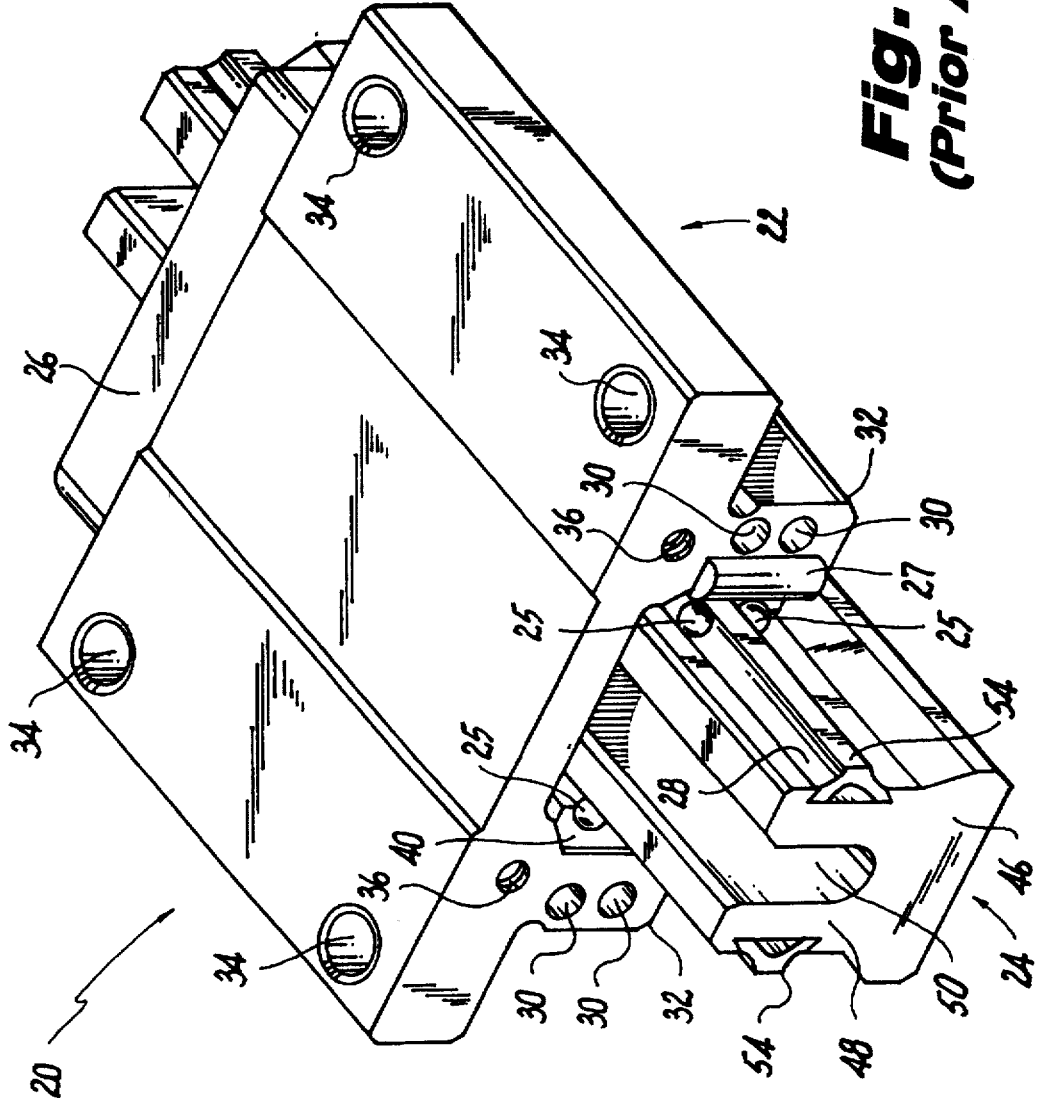
FIG. 1 is a perspective view of an assembled linear motion bearing assembly having race inserts in accordance with the prior art.

Referring now to the drawings in detail, and initially to FIG. 1, an assembled linear motion bearing assembly 20 having race inserts in accordance with the prior art is shown. Prior art race inserts are disclosed, for example, in U.S. Pat. No. 4,932,067 to Pester et al. and U.S. Pat. No. 5,431,498 to Lyon. The bearing assembly 20 in FIG. 1 includes an inverted substantially U-shaped bearing carriage 22 configured and dimensioned to move along a rail assembly 24 on rolling elements 25. Although shown here as balls, other rolling elements are also contemplated including rollers.

Preferably, rail assembly 24 includes a substantially U-shaped base member 46 formed of a machine grade aluminum and extruded using known production techniques. The base member 46 includes a pair of parallel vertical arms 48 defining an axial groove 50 along the longitudinal length of the base member 46. This configuration provides an advantageous degree of flexibility to the vertical arms 48.

End caps 26 are positioned on each longitudinal end of the bearing carriage 22. The end caps 26 include semitoroidal turnarounds (not shown) integrally formed in each of the end caps 26 and serve to enclose and connect corresponding load bearing and return tracks, 28 and 30 respectively, located in depending legs 32 of the bearing carriage 22. A load bearing track insert 54 defines a portion of load bearing tracks 28. Return tracks 30 comprise parallel longitudinal bores drilled axially through the depending legs 32 of the bearing carriage 22.

Mounting holes 34 are formed in the upper planar surface of the bearing carriage 22 and facilitate engagement of the bearing assembly 20 to desired machinery components.

Longitudinal mounting bores 36 are formed in each longitudinal end face of the bearing carriage 22 and serve to attach end caps 26. Inner guides 27 are positioned between the ends of the load bearing tracks 28 and return tracks 30. The inner guides 27 ease the movement of the rolling elements 25 between the respective tracks.

Figure 2:
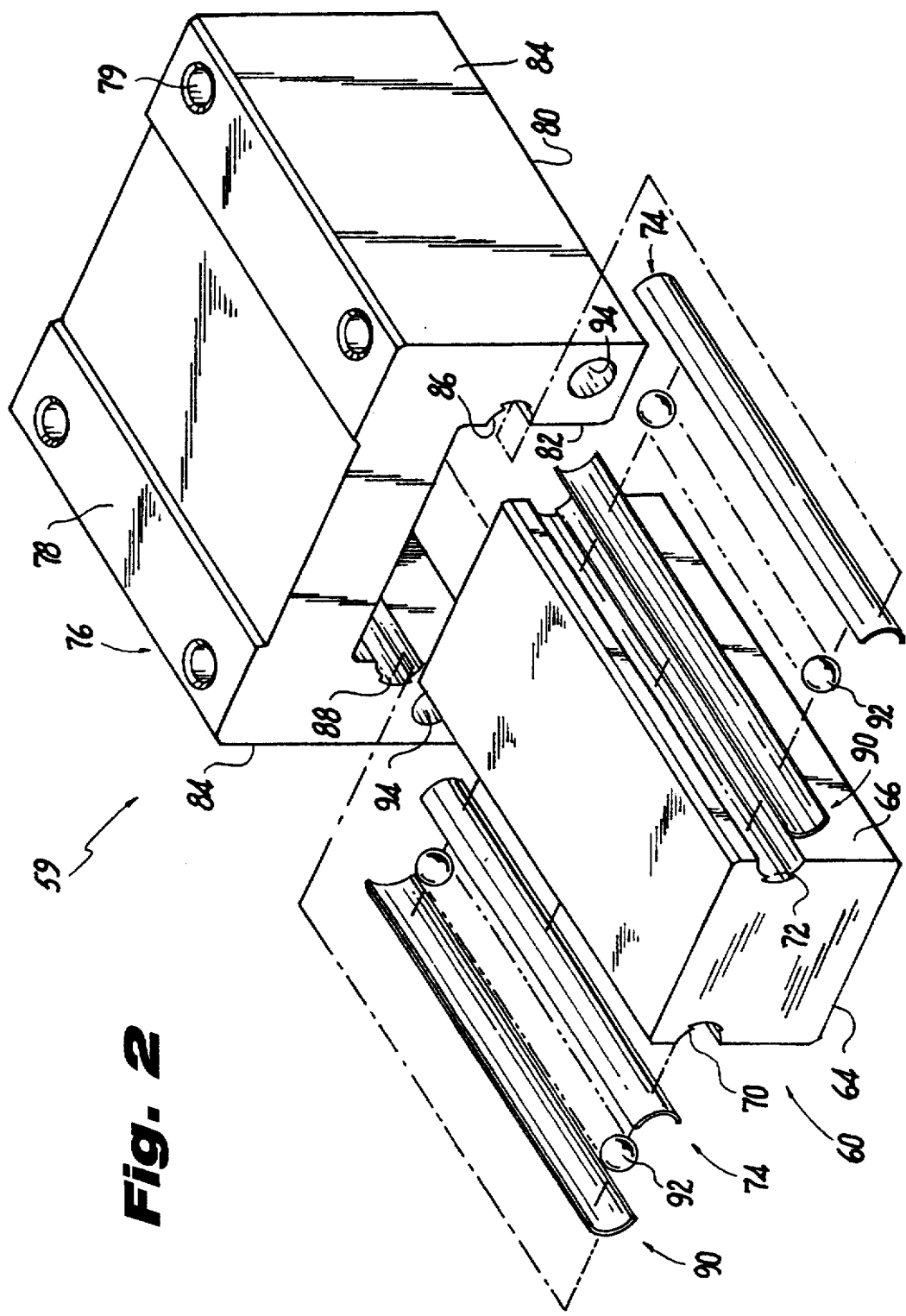
FIG. 2 is an exploded perspective view of one embodiment of a linear motion bearing assembly having race inserts in accordance with the present invention.

FIG. 2 illustrates an exploded perspective view of a linear motion bearing assembly 59 having race inserts in accordance with the present invention. A rail assembly 60 is shown having outer surfaces 66 extending substantially vertical from a base portion 64 of rail assembly 60. In a preferred embodiment, outer surfaces 66 of rail assembly 60 have a longitudinal groove 70 formed therein for receiving a rail race insert 74. Furthermore, longitudinal groove 70 has a longitudinal groove 72 axially formed therein; longitudinal groove 72 being narrower than longitudinal groove 70. Rail assembly 60 is preferably manufactured from aluminum, and anodized to provide corrosion resistance. Rail assembly 60 may also be formed of a relatively flexible machine grade material such as, for example, aluminum, plastic or steel.

A bearing carriage assembly 76 is shown having a bearing carriage portion 78 and a pair of depending legs 80 extending therefrom. Mounting holes 79 may also be formed in the upper planar surface of the bearing carriage 78 to facilitate engagement of the bearing assembly 59 to desired machinery components. The bearing carriage assembly 76 is preferably formed of a relatively flexible machine grade material such as, for example, aluminum, plastic or steel. The bearing carriage assembly 76 may also be anodized to provide corrosion resistance. Depending legs 80 have respective facing sides 82 and opposing sides 84. Facing sides 82 define a longitudinal channel for accommodating rail assembly 60. In a preferred embodiment, facing sides 82 have two longitudinal grooves 86 and 88 formed therein for receiving a carriage race insert 90. Longitudinal groove 88, being narrower than longitudinal groove 86, is disposed axially within longitudinal groove 86. Rail race insert 74 and carriage race insert 90 are preferably formed of a high-strength stainless steel and are typically extruded or roll-formed to shape from flat rolled stock using known production techniques.

A plurality of rolling elements 92 are disposed within a track formed by rail race insert 74 and carriage race insert 90 as they are inserted within the respective rail or carriage assembly along the dashed lines. Although shown here as balls, other rolling elements are also contemplated including rollers. Preferably the rolling elements are formed of stainless steel. Load is therefore transmitted from the bearing carriage assembly 76, through the carriage race insert 90, through the rolling element 92, through the rail race insert 74 to the rail assembly 60.

In a preferred embodiment, the linear motion bearing assembly of the present invention is a recirculating type bearing. Therefore, a means for recirculating the rolling elements 92 is provided. A longitudinal cylindrical bore 94 is provided as a return path for unloaded rolling elements 92. As shown in FIG. 1, the means for recirculating rolling elements 92 from a loaded position between rail race insert 74 and carriage race insert 90 to an unloaded position within cylindrical bore 94 typically includes end caps positioned on each longitudinal end of bearing carriage assembly 76. The end caps typically include semi-toroidal turnarounds integrally formed therein and serve to enclose and connect corresponding load bearing and return tracks.

Figure 3:
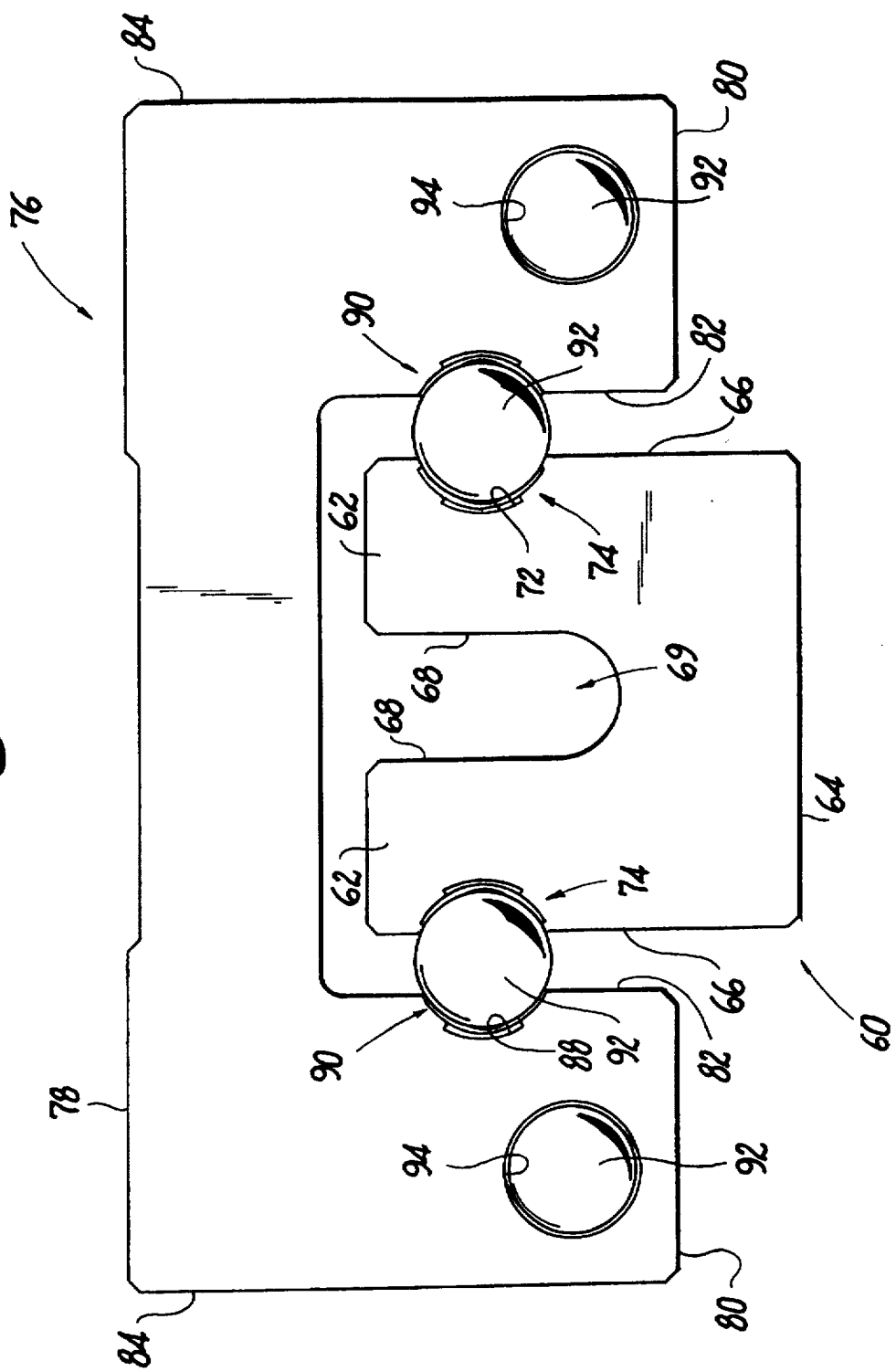
FIG. 3 is a cross-sectional end view of another embodiment of a linear motion bearing assembly having race inserts.

Referring now to FIG. 3, a cross-sectional detail end view of the position of the inserted races in a linear motion bearing is shown. A rail assembly 60 is shown, preferably having arms 62 extending substantially vertical from a base portion 64 of rail assembly 60. Arms 62 comprise outer surfaces 66 and inner surfaces 68. Inner surfaces 68 of arms 62 define a compensation channel 69 for advantageously providing load stabilizing movement within the rail assembly 60. More specifically, the load stabilizing movement is accomplished by the flexibility of arms 62 with respect to base portion 64. Compensation channel 69 is preferably U-shaped in cross-section. In a preferred embodiment, outer surfaces 66 of arm 62 have a longitudinal groove 70 formed therein for receiving a rail race insert 74. Furthermore, longitudinal groove 70 has a longitudinal groove 72 axially formed therein; longitudinal groove 72 being narrower than longitudinal groove 70. Rail assembly 60 is preferably manufactured from aluminum, and anodized to provide an advantageous degree of corrosion resistance. Rail assembly 60 may also be formed of a relatively flexible machine grade material such as, for example, aluminum, plastic or steel.

A bearing carriage assembly 76 is shown having a bearing carriage portion 78 and a pair of depending legs 80 extending therefrom. The bearing carriage assembly 76 is preferably formed of a relatively flexible machine grade material such as, for example, aluminum, plastic or steel. The bearing carriage assembly 76 may also be anodized to provide corrosion resistance. Depending legs 80 have respective facing sides 82 and opposing sides 84. Facing sides 82 define a longitudinal channel for accommodating rail assembly 60. In a preferred embodiment, facing sides 82 have two longitudinal grooves 86 and 88 formed therein for receiving a carriage race insert 90. Longitudinal groove 88, being narrower than longitudinal groove 86, is disposed axially within longitudinal groove 86. Rail race insert 74 and carriage race insert 90 are preferably formed of a high-strength stainless steel and are typically extruded or roll-formed to shape from flat rolled stock using known production techniques.

A plurality of rolling elements 92 are disposed between rail race insert 74 and carriage race insert 90. Although shown here as balls, other rolling elements are also contemplated including rollers. Preferably the rolling elements are formed of stainless steel. Load is therefore transmitted from the bearing carriage assembly 76, through the carriage race insert 90, through the rolling element 92, through the rail race insert 74 to the rail assembly 60.

In a preferred embodiment, the linear motion bearing assembly of the present invention is a recirculating type bearing. Therefore, a means for recirculating the rolling elements 92 is provided. A longitudinal cylindrical bore 94 is provided as a return path for unloaded rolling elements 92. As shown in FIG. 1, the means for recirculating rolling elements 92 from a loaded position between rail race insert 74 and carriage race insert 90 to an unloaded position within cylindrical bore 94 typically includes end caps positioned on each longitudinal end of bearing carriage assembly 76. The end caps typically include semi-toroidal turnarounds integrally formed therein and serve to enclose and connect corresponding load bearing and return tracks.

Figure 4:
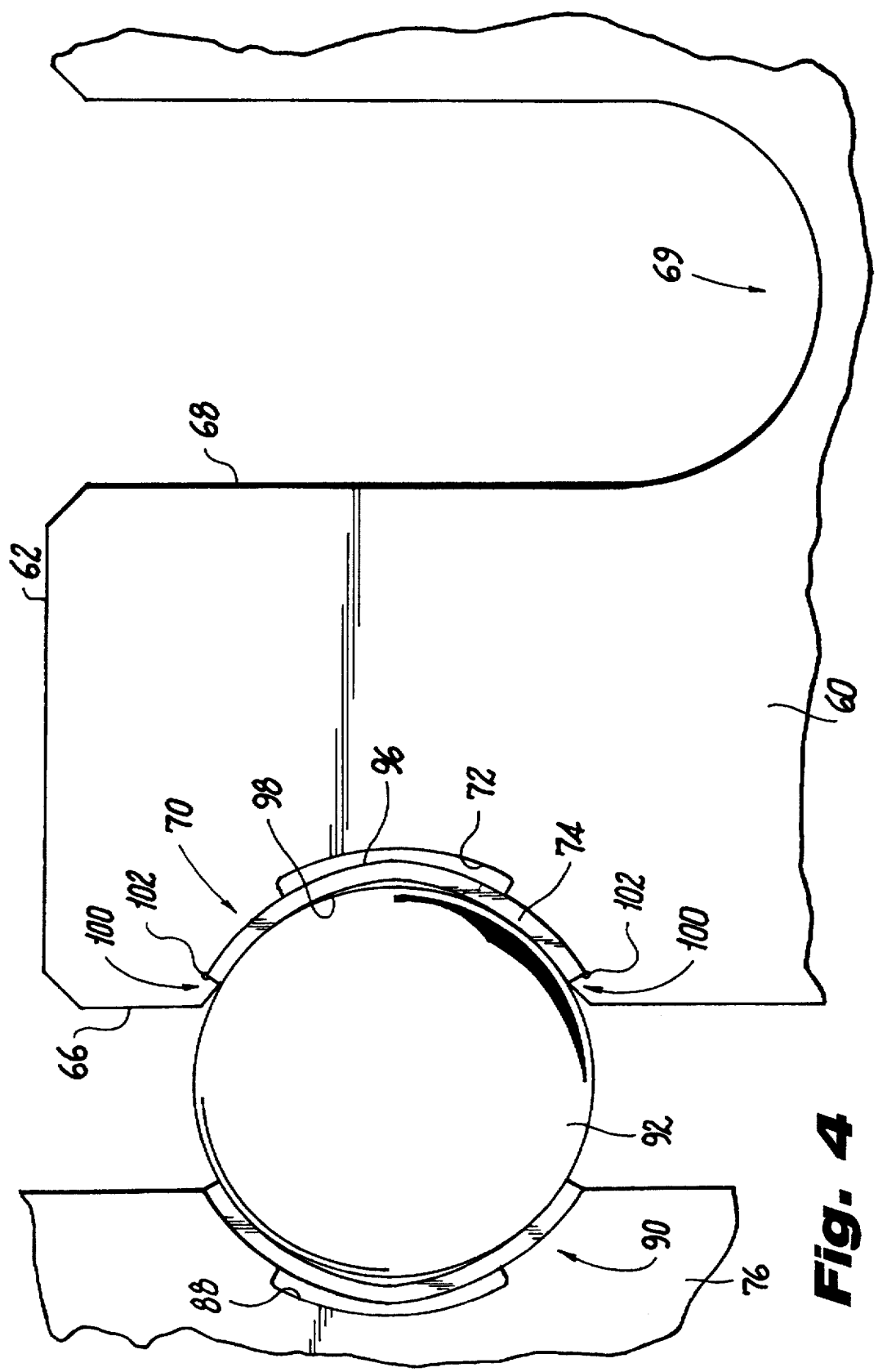
FIG. 4 is an enlarged cross-sectional end view illustrating a detail of race inserts within rail and carriage support structures.

As best seen in FIG. 4, the rail race insert 74 is disposed within the longitudinal groove 70 of the rail assembly 60. Rail race insert 74 preferably has a substantially uniform thickness in cross-section. The rail race insert 74 is preferably slightly bent along a longitudinal axis to produce a convex surface 96 and a concave surface 98. Rail race insert 74 is sprung or snap-fit into longitudinal groove 70 and held in place by means of substantially orthogonal ends 100 of longitudinal groove 70. Reliefs 102 are formed by the longitudinal groove 70 and orthogonal ends 100, to determinately state the race insert 96. Advantageously, as discussed below with reference to FIG. 5, simple stress analysis provides that the concave surface 98 will assume a condition of compression while the convex surface 96 will assume a condition of tension.

Referring now to FIG. 5, a detail perspective view of a rail race insert 74, a carriage race insert 90 and a plurality of rolling elements 92 is shown. As discussed above, race inserts 84 and 90 have a substantially uniform thickness in cross-section. As illustrated, race inserts 74 and 90 are preferably bent along a longitudinal axis to produce convex surfaces 96 and 104 and concave surfaces 98 and 106. The external force necessary to deform race inserts 74 and 90 creates an internal distributed force or stress within the convex surfaces 96 and 104 and the concave surfaces 98 and 106. The deformation results in a lengthening of the surfaces defined as convex surfaces 96 and 104, and a shortening of the surfaces defined as concave surfaces 98 and 106. Therefore, pursuant to simple stress analysis, the convex surfaces 96 and 104 will be in tensile stress and the concave surfaces 98 and 106 will be in compressive stress. Since rolling elements 92 transfer load between the concave surfaces 98 and 106, a linear motion bearing configuration is disclosed that has a plurality of race inserts for both carriage and rail assemblies and that also provides a predisposition of compressive stresses on the load bearing surfaces of the race inserts.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A linear motion bearing assembly comprising:

a rail assembly including an elongate base member having a pair of substantially vertical outer surfaces;

a bearing carriage assembly including a bearing carriage, a pair of depending legs extending therefrom, said depending legs having respective facing and opposing sides, said facing sides defining a longitudinal channel for accommodating said rail assembly;

a plurality of load bearing inserts, each of said inserts defining a portion of at least one load bearing track, said inserts being positionable on at least one of said facing sides of said depending legs and said outer surfaces of said rail assembly to define at least one load bearing track interposed said outer surfaces and said depending legs, said plurality of load bearing inserts having a load bearing surface and a non-load bearing surface, said load bearing surface having a predisposed compressive stress; and a plurality of rolling elements disposed in said load bearing tracks.

2. A linear motion bearing assembly as recited in claim 1, wherein said outer surfaces have at least one first longitudinal groove, said outer surfaces further having at least one second longitudinal groove disposed axially within said at least one first longitudinal groove, said at least one second longitudinal groove being narrower than said at least one first longitudinal groove; and said facing sides having at least one first longitudinal groove, said facing sides further have at least one second longitudinal groove disposed axially within said at least one first longitudinal groove, said at least one second longitudinal groove being narrower than said at least one first longitudinal groove.

3. A linear motion bearing assembly as recited in claim 2, wherein said plurality of inserts are disposed in at least one of said at least one first longitudinal groove in said facing sides of said depending legs and said at least one first longitudinal groove in said outer surfaces of said rail assembly.

4. A linear motion bearing assembly as recited in claim 1, wherein said plurality of load bearing inserts are bent along a longitudinal axis to form a concave load bearing surface and a convex non-load bearing surface.

5. A linear motion bearing assembly as recited in claim 1, wherein said plurality of load bearing inserts have a substantially uniform thickness in cross-section.

6. A linear motion bearing assembly as recited in claim 1, wherein said base member of said rail assembly is fabricated from a machine grade material selected from the group consisting of aluminum, plastic and steel.

7. A linear motion bearing assembly as recited in claim 1, wherein bearing carriage assembly is fabricated from a machine grade material selected from the group consisting of aluminum, plastic and steel.

8. A linear motion bearing assembly as recited in claim 1, wherein said rolling elements are balls.

9. A linear motion bearing assembly as recited in claim 1, wherein said elongate base member further comprises a pair of substantially vertical arms, said arms having respective inner surfaces and outer surfaces.

10. A linear motion bearing assembly as recited in claim 9, wherein said vertical arms have flexible characteristics with respect to said elongate base member.

11. A linear motion bearing assembly as recited in claim 1, wherein said depending legs have flexible characteristics with respect to said bearing carriage.

12. A linear motion bearing assembly comprising:

a rail assembly including an elongate base member having a pair of substantially vertical arms extending from said base member, said substantially vertical arms having respective inner and outer surfaces;

a bearing carriage assembly including a bearing carriage, a pair of depending legs extending therefrom, said depending legs having respective facing and opposing sides, said facing sides defining a longitudinal channel for accommodating said rail assembly;

a plurality of load bearing inserts, each of said inserts defining a portion of at least one load bearing track, said inserts being positionable on at least one of said facing sides of said depending legs and said outer surfaces of said substantially vertical arms to define at least one load bearing track interposed said vertical arms and said depending legs, said plurality of load bearing inserts having a load bearing surface and a non-load bearing surface, said load bearing surface having a predisposed compressive stress; and a plurality of rolling elements disposed in said load bearing tracks.

13. A linear motion bearing assembly as recited in claim 12, wherein said substantially vertical arms have flexible characteristics with respect to said elongate base member.

14. A linear motion bearing assembly as recited in claim 12, wherein said inner surfaces of said substantially vertical arms define a substantially U-shaped channel.

15. A linear motion bearing assembly as recited in claim 12, wherein said outer surfaces have at least one first longitudinal groove, said outer surfaces further having at least one second longitudinal groove disposed axially within said at least one first longitudinal groove, said at least one second longitudinal groove being narrower than said at least one first longitudinal groove; and said facing sides having at least one first longitudinal groove, said facing sides further have at least one second longitudinal groove disposed axially within said at least one first longitudinal groove, said at least one second longitudinal groove being narrower than said at least one first longitudinal groove.

* * * * *